(12) United States Patent
Pan

(10) Patent No.: US 8,310,443 B1
(45) Date of Patent: Nov. 13, 2012

(54) PIE CHART TIME INDICATOR

(75) Inventor: Yu Pan, San Francisco, CA (US)

(73) Assignee: Google Inc., Mountain View, CA (US)

( * ) Notice: Subject to any disclaimer, the term of this patent is extended or adjusted under 35 U.S.C. 154(b) by 986 days.

(21) Appl. No.: 12/114,408

(22) Filed: May 2, 2008

Related U.S. Application Data (60) Provisional application No. 60/915,654, filed on May 2, 2007.

(51) Int. Cl.
G09G 5/00 (2006.01)
(52) U.S. Cl. .................................. 345/156; 715/700
(58) Field of Classification Search ................. 715/700, 715/818, 819, 772; 345/156
See application file for complete search history.

(56) References Cited

U.S. PATENT DOCUMENTS

| | | | | |
|---|---|---|---|---|
| 5,638,523 | A * | 6/1997 | Mullet et al. | 715/855 |
| 5,790,122 | A * | 8/1998 | Cecchini et al. | 715/854 |
| 5,801,747 | A | 9/1998 | Bedard | |
| 6,091,416 | A | 7/2000 | Cragun | |
| 6,097,390 | A * | 8/2000 | Marks | 715/772 |
| 6,282,713 | B1 | 8/2001 | Kitsukawa et al. | |
| 6,698,020 | B1 | 2/2004 | Zigmond et al. | |
| 7,043,746 | B2 | 5/2006 | Ma | |
| 7,356,477 | B1 | 4/2008 | Allan et al. | |
| 7,519,273 | B2 | 4/2009 | Lowthert et al. | |
| 7,870,023 | B2 | 1/2011 | Ozer et al. | |
| 2002/0078456 | A1 | 6/2002 | Hudson et al. | |
| 2002/0087402 | A1 | 7/2002 | Zustack et al. | |
| 2002/0109729 | A1 | 8/2002 | Dutta | |
| 2003/0083937 | A1 | 5/2003 | Hasegawa et al. | |
| 2004/0117827 | A1 | 6/2004 | Karaoguz et al. | |
| 2004/0133910 | A1 | 7/2004 | Gordon et al. | |
| 2004/0199657 | A1 * | 10/2004 | Eyal et al. | 709/231 |
| 2005/0028190 | A1 | 2/2005 | Rodriguez et al. | |
| 2005/0034151 | A1 | 2/2005 | Abramson | |
| 2005/0137958 | A1 | 6/2005 | Huber et al. | |
| 2005/0267813 | A1 | 12/2005 | Monday | |
| 2006/0013555 | A1 | 1/2006 | Poslinski | |
| 2006/0015904 | A1 | 1/2006 | Marcus | |
| 2006/0020966 | A1 * | 1/2006 | Poslinski | 725/37 |
| 2006/0048186 | A1 | 3/2006 | Alterman | |
| 2006/0107285 | A1 | 5/2006 | Medvinsky | |

(Continued)

FOREIGN PATENT DOCUMENTS

WO    WO 2007/047645 A1    4/2007

OTHER PUBLICATIONS

Berg, J., "Google AdSense to Benefit YouTube," iMedia Connection, Oct. 10, 2006, 1 pages, [online] [retrieved on Mar. 22, 2010] Retrieved from the Internet <URL:http://www.imediaconnection.com/content/11634.imc>.

(Continued)

*Primary Examiner* — Amare Mengistu
*Assistant Examiner* — Shawna Stepp Jones
(74) *Attorney, Agent, or Firm* — Fenwick & West LLP (57) ABSTRACT

A system, method and various user interfaces enable association of advertising content with requested shared video content for access via a web-based video player. Advertising content is provided selectively after playback of video content. Following presentation of video content, multiple panes of "similar videos" window are presented in a manner that cycle with time as tracked by a pie chart time indicator.

29 Claims, 5 Drawing Sheets

U.S. PATENT DOCUMENTS

| | | |
|---|---|---|
| 2006/0140584 A1 | 6/2006 | Ellis et al. |
| 2006/0179466 A1 | 8/2006 | Pearson et al. |
| 2006/0214947 A1 | 9/2006 | Boose et al. |
| 2006/0218577 A1 | 9/2006 | Goodman et al. |
| 2006/0230427 A1 | 10/2006 | Kunkel et al. |
| 2006/0259588 A1 | 11/2006 | Lerman et al. |
| 2006/0259589 A1 | 11/2006 | Lerman et al. |
| 2006/0271977 A1 | 11/2006 | Lerman et al. |
| 2007/0100699 A1 | 5/2007 | Ajizadeh |
| 2007/0107010 A1 | 5/2007 | Jolna et al. |
| 2007/0130015 A1 | 6/2007 | Starr et al. |
| 2007/0174774 A1 | 7/2007 | Lerman et al. |
| 2007/0183741 A1 | 8/2007 | Lerman et al. |
| 2007/0189708 A1 | 8/2007 | Lerman et al. |
| 2007/0226053 A1 | 9/2007 | Carl et al. |
| 2008/0021775 A1 | 1/2008 | Lerman et al. |
| 2008/0109306 A1 | 5/2008 | Maigret et al. |
| 2008/0109844 A1 | 5/2008 | Baldeschwieler et al. |
| 2008/0127280 A1 | 5/2008 | Kuang et al. |
| 2008/0147500 A1 | 6/2008 | Slaney et al. |
| 2008/0155585 A1 | 6/2008 | Craner et al. |
| 2008/0270389 A1 | 10/2008 | Jones et al. |
| 2009/0030802 A1 | 1/2009 | Plotnick et al. |
| 2009/0138904 A1 | 5/2009 | Kitsukawa et al. |
| 2009/0149743 A1 | 6/2009 | Marron et al. |
| 2009/0199230 A1 | 8/2009 | Kumar et al. |
| 2010/0198697 A1 | 8/2010 | Brown et al. |
| 2011/0119700 A1 | 5/2011 | Hamilton |

OTHER PUBLICATIONS

"Idea: How to Put Ads into YouTube," www.adverlab.blogspot.com, Nov. 22, 2006, 1 page, [online] [retrieved on Mar. 22, 2010] Retrieved from the Internet <URL:http://adverlab.blogspot.com/2006/11/idea-how-to-put-ads-intoyoutube.html>.

Anonymous: "Improved Ads for YouTube 1-15 Videos—Overlay Advertising," www.vlogblog.com, Aug. 22, 2007, 1 page, [online] [retrieved on Mar. 24, 2010] Retrieved from the Internet <URL:http://www.vlogblog.com/index.php/arch ives/2007/08/22/improved-ads-for-youtube-videos-overlay-advertising/>.

Supplementary European Search Report for European Patent Application No. EP 08747251, Apr. 20, 2010, 9 pages.

Office Action of the European Patent Office for European Patent Application No. EP 08755012.5, Aug. 30, 2010, 3 pages.

Supplementary European Search Report for European Patent Application No. EP 08755012.5, Apr. 20, 2010, 9 pages.

Examiner's First Report on Australian Patent Application No. 2008247732, Jul. 13, 2011, 3 pages.

First Office Action for Chinese Patent Application No. 200880019963.9, May 6, 2011, 15 Pages.

First Office Action for Chinese Patent Application No. 200880019399.0, Apr. 25, 2011, 11 Pages.

Van Buren, S., "YouTube's external video player = seductive user interface design." A Matter of Degree, A Microsoft SharePoint/Information Architecture/Web Usability blog, Dec. 27, 2006, 2 pages, [online] [retrieved on Feb. 26, 2011] Retrieved from the Internet <URL: http://amatterofdegree.typepad.com/a_matter_of_degree/2006/12/youtubes_extern.html>.

"How to Embed Windows Media Files," MediaCollege, Nov. 24, 2005, 1 page, [online] [retrieved on Feb. 26, 2011] Retrieved from the Internet <URL:http://web.archive.org/web/20051124210305/http://www.mediacollege.com/video/format/windows-media/streaming/embed.html>.

*AJAX Activity Indicators*, Archived on Dec. 25, 2006 on www.web.archive.org [Online] [Retrieved on Jun. 10, 2008, Retrieved from the Internet <URL:http://web.archive.org/web/20061225134638/http://www/napyfab.com/ajax-indicators/>.

Delaney, Kevin J., *Start-ups seek to cash in on Web-Video Ads*, Wall Street Journal, Mar. 2, 2007, [Online] [Retrieved Sep. 3, 2008] Retrieved from the Internet <URL: http://www.scanscout.com/wsj-070302.html>.

"Overlay & Video AdType," ScanScout, 2007, [online] [Retrieved on Jul. 15, 2008] Retrieved from the internet <URL://demo.scanscout.com/livedemo.shtml?adType=overlay&videoAdType=rightSide&ss...>.

Riley, D., "Contextual In-Video Advertising: ScanScout," May 14, 2007, [online] [Retrieved on Jul. 15, 2008] Retrieved from the internet <URL://www.techcrunch.com/2007/05/14/contextual-in-video-advertising-scanscout/>.

Strange, A., "VideoEgg Exec: YouTube's New Ads Are Just Like Ours," Wired Blog Network, Aug. 22, 2007, [online] [Retrieved on Jul. 15, 2008] Retrieved from the internet <URL:http://blog.wired.com/business/2007/08/network-wars-vi.html>.

PCT International Search Report and Written Opinion, PCT/US08/62103, Aug. 26, 2008, 9 Pages.

PCT International Search Report and Written Opinion, PCT/US08/62442, Jul. 14, 2008, 9 Pages.

\* cited by examiner

PIE CHART TIME INDICATOR

CROSS-REFERENCE TO RELATED APPLICATIONS

This application claims the benefit of U.S. Provisional Application 60/915,654, filed on May 2, 2007, and incorporated by reference herein in its entirety.

TECHNICAL FIELD

The present invention relates generally to web-based video display and specifically to user interface features for managing video and advertising content in an online content distribution system.

BACKGROUND

The sharing of video content on websites has developed into a worldwide phenomenon, supported by dozens of websites. On average, over 10,000 videos are posted every day, and this number is increasing as the tools and opportunities for capturing video become easy to use and more widespread. Shared video content provides good opportunities to present advertising material to viewers along with the requested video content. However, some mechanisms for delivering advertising with shared video have been relatively ineffective, while others are perceived by users as being objectionable.

People who use video sharing services have a wide range of motivations for using those services. Some are interested in specific information in the shared content, while others are just browsing in a leisurely manner through the content. Advertising that appears in conjunction with the video content, in order to be effective as well as maintain a satisfactory experience for the user, needs to be presented in a manner that takes these widely varying user characteristics into account.

Video content is now delivered to users via a wide range of technologies, each of which has established mechanisms for delivering advertising content. Movies commercially released in DVD format, for example, generally come with trailers for other movies from the same production company. These trailers are often presented automatically when the user seeks to watch the primary program; sometimes it is difficult if not impossible for a user to avoid watching the advertising content. Many users have expressed dismay at the requirement to sit through undesired advertisements, particularly after they have already paid a substantial amount to buy the DVD. Furthermore, the advertising content is often out of date when the DVD is watched some period of time after it is first released. The overall user satisfaction with this sort of advertising has been mixed.

More recently, major television networks have made available some of their programming on their websites. The players that they use typically require a viewer to watch advertising content before, during or after the requested programming. Initial reactions from such websites have also been mixed.

There remains a need for a flexible interface that allows requested video content and advertising to be presented in a manner that is both satisfying to the viewer and effective for advertisers.

SUMMARY

Various systems, methods and software tools enable users who are viewing videos on a website to control certain aspects of their playback experience, and also enable the content provider to provide advertising content in an effective manner.

In one aspect, following presentation of video content, multiple panes of "similar videos" window are presented in a manner that cycle with time. User arrow buttons for moving forward and back through such panes without waiting for the default cycling period are provided. In a particular embodiment, the forward control is a circular button with a right-facing arrow, and the circumference of the button has an integrated timer, implemented as a visual indicator at the edge of the button, gradually disappearing with a clockwise sweeping movement such as would be provided by a clock's second hand.

In a second aspect, a user interface presents a first portion of information (e.g., a first set of recommended videos), and a navigation control. The navigation control is responsive to a user selection for presenting a second portion of information (e.g., a second set of recommended videos). The control includes a user discernable timer. If the user does not make a selection within the duration indicated by the timer, the second portion of information is presented.

Further to such an aspect, the timer can be interrupted responsive to a first user action such as a mouseover of the first portion of information. The timer resumes responsive to a second user action, such as ceasing to mouseover the first portion of the presented information.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following discussion that alternative embodiments of the structures and methods illustrated herein may be employed without departing from the principles of the invention described herein.

DESCRIPTION OF EMBODIMENTS

Figure 1:
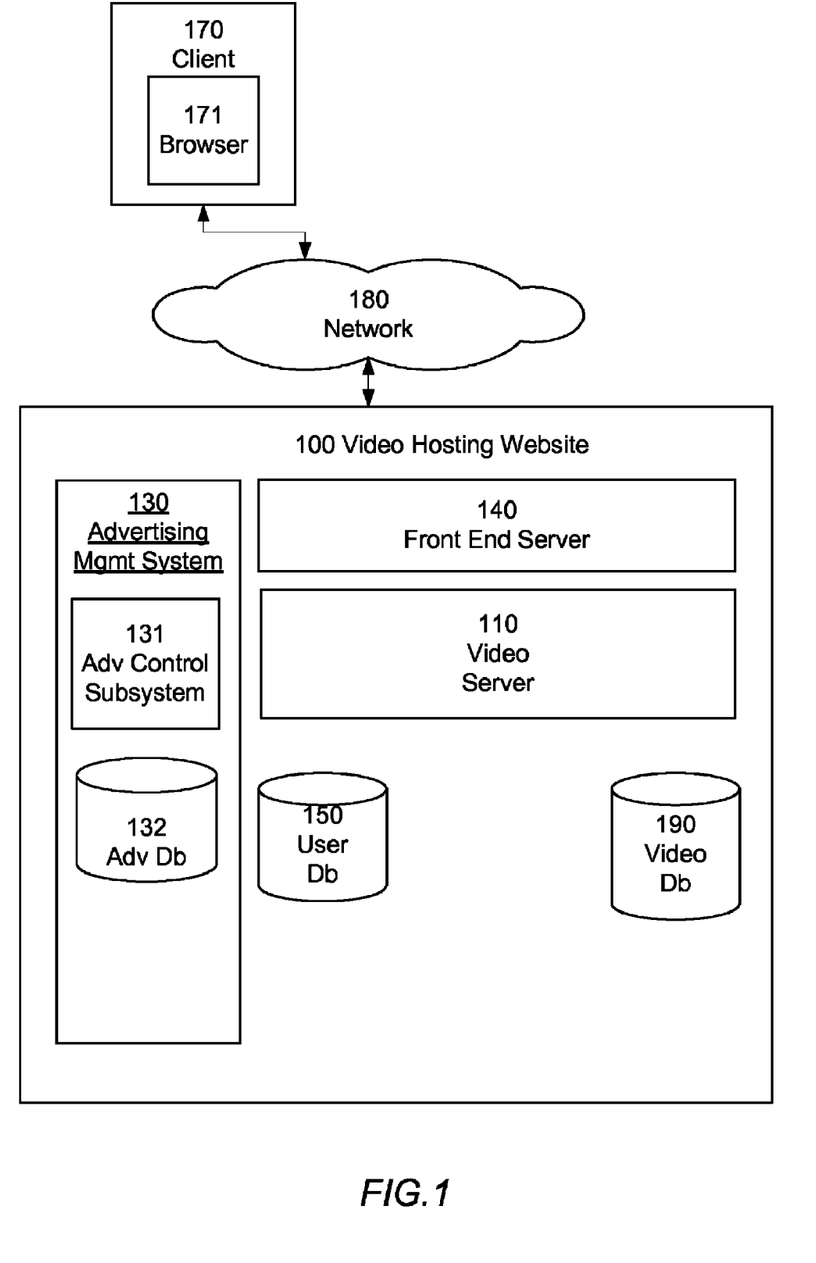
FIG. 1 is a block diagram of a system architecture for providing user interfaces for displaying both advertising and video content.

It is to be understood that the Figures and descriptions of the present invention have been simplified to illustrate elements that are relevant for a clear understanding of the present invention, while eliminating, for the purpose of clarity, many other elements found in a typical web-based video player and method of using the same. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

FIG. 1 is a block diagram of a system architecture in accordance with one embodiment. As shown in FIG. 1, a video hosting website 100 includes a front end server 140, an advertising management system 130, a video server 110 and various databases, including a user database 150 and a video database 190. Many conventional features, such as firewalls, load balancers, application servers, failover servers, site management tools, and so forth are not shown so as to more clearly illustrate the features of the system. A suitable website 100 for implementation of the system is the YOUTUBE™ website, found at www.youtube.com; other video hosting sites are known as well, and can be adapted to operate according the teaching disclosed herein. It will be understood that the term "web site" represents any method of uploading and downloading content and is not intended to be limited to content uploaded or downloaded via the Internet or the HTTP protocol. The various servers are conventionally implemented, whether as a single piece of software or hardware or as multiple pieces of software or hardware. In general, functions described in one embodiment as being performed on the server side can also be performed on the client side in other embodiments if appropriate.

A client 170 executes a browser 171, and connects to the front end server 140 via a network 180, which is typically the Internet, but may also be any network, including but not limited to a LAN, a MAN, a WAN, a mobile, wired or wireless network, a private network, or a virtual private network. While only a single client 170 and browser 171 are shown, it is understood that very large numbers (e.g., millions) of clients are supported and can be in communication with the website 100 at any time. In some embodiments, the browser 171 include a third party video player (e.g., the Flash™ player from Adobe Systems, Inc.), or any other player adapted for the video file formats used in the site 100. Typically, a user accesses a video from the site 100 by browsing a catalog of videos, conducting searches on keywords, reviewing playlists from other users or the system administrator (e.g., collections of videos forming channels), or viewing videos associated with particular user groups (e.g., communities). In some embodiments, browser 171 also accesses a video file indirectly, via an embedded video that is accessed via an embedded hyperlink in a third party website.

Users of the client 170 and browser 171 can upload content (which can include, for example, video, audio, or a combination of video and audio) to the site 100 via the network 180. The uploaded content is processed and placed for storage in the video database 190. This processing can include format conversion, compression, metadata tagging, and other data processing. In some embodiments, an uploaded content file is associated with the uploading user, and so the user's account record is updated in the user database 150 as needed. In some embodiments, other data relating to the user is also placed for storage in database 150. For example, the user may be asked to self-select certain categories or product/service types of interest, for the purpose of allowing the user to self-select various types of content and advertising that the website 100 presents to the user.

For purposes of convenience and the description of one embodiment, the uploaded content will be referred to a "videos" or "video files", but no limitation on the types of content that can be uploaded are intended by this terminology.

The advertising management system 130 stores advertising content to be presented along with the user-requested content. In some instances, the advertising content is in the same format as the user-requested content (e.g., video advertising for a video content request). In other instances, other types of advertising are presented to the user, such as pure text advertising, advertising providing a hyperlink to an advertiser's website, text-and-audio advertising, and still image advertising. An advertising control subsystem 131 both manages access to the advertising content stored in the advertising database 132, and also serves to associate certain advertising content with certain user-requested content. In one embodiment, the association is made solely on the content of the requested video, while in another the association is made based on other factors as well, such as user-specific information stored in the user database 150. Thus, a user who has self-identified as wanting to learn more about new movies may be presented with a greater frequency of movie-oriented advertising content than a user who had not indicated such a preference.

Figure 2:
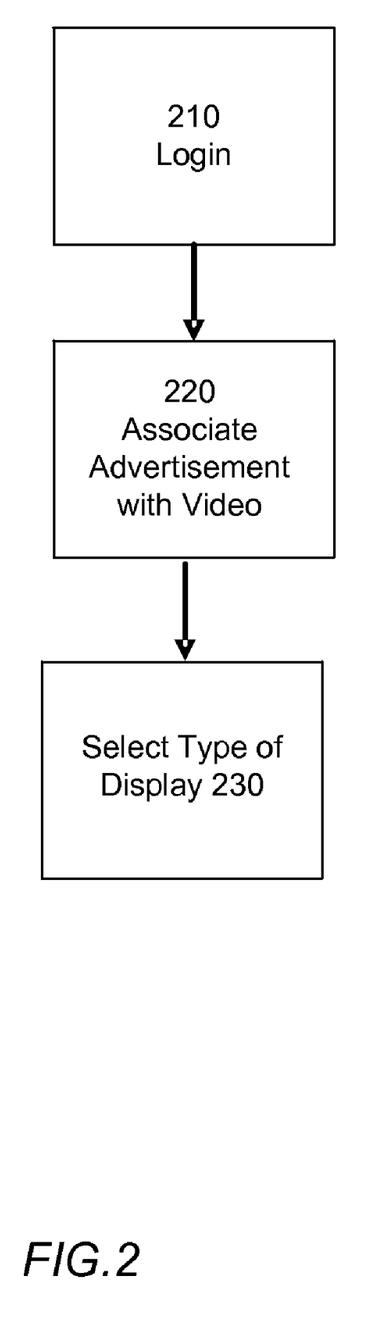
FIG. 2 is a process flow for associating advertising with video.

FIG. 2 illustrates one embodiment of a process for presenting advertising content along with shared video, such as provided via system 130. For the purposes of this explanation, FIG. 2 begins with an administrator logging in 210 to the advertising management system 130. The administrator then selects 220 advertising content to associate with a particular shared video. In one embodiment, this association is made manually. In another embodiment, advertising content is automatically associated with video content. In another embodiment, owners or stewards of the content choose which ads are associated with their content. In some circumstances, such association is random while in other instances, the association may be made based on some aspect of the video content. For example, if a video shows a litter of puppies, metadata for that video may be processed so as to trigger association with advertising content for a pet food company. As mentioned above, metadata concerning a particular user is also used in some embodiments to determine which advertising content to associate with a particular display of a video. In another embodiment, advertising content is chosen in accordance with previous actions or characteristics of the user, so that a first user will view a first ad and a second user will view a different ad when they watch the same video.

Once association 220 is made, the administrator selects 230 the type of advertising display to be used with the video. For example, the administrator can select for the advertisements to be displayed prior to the requested content ("pre-roll"), during the requested content ("mid-roll"), or after the requested content ("post-roll"). The description that follows assumes that the advertisements will be played as a "post-roll" after the requested content. However, the described techniques can be applied to other variations of advertisement displays.

In the post-roll display, the user of a video playback website is typically presented with suggestions for other, potentially related, video content after watching the requested content. In many situations, overall user satisfaction concerns dictate that the user not be distracted too much from making those post-playback selections of related videos; however, it is found that just after playback the user is in a very receptive state for advertisements. Accordingly an effective placement of advertising is found to be one that presents an advertising play button nearby, but distinct from, buttons allowing the selection of suggested videos. In one embodiment, an advertising play button is placed in the same overall window as the buttons for suggested videos, yet separated from the suggested video buttons by user interface controls for sharing the video that has just been watched and for watching the video again. Further detail on post-roll advertising display is presented in connection with the discussion of FIG. 3.

Figure 3:
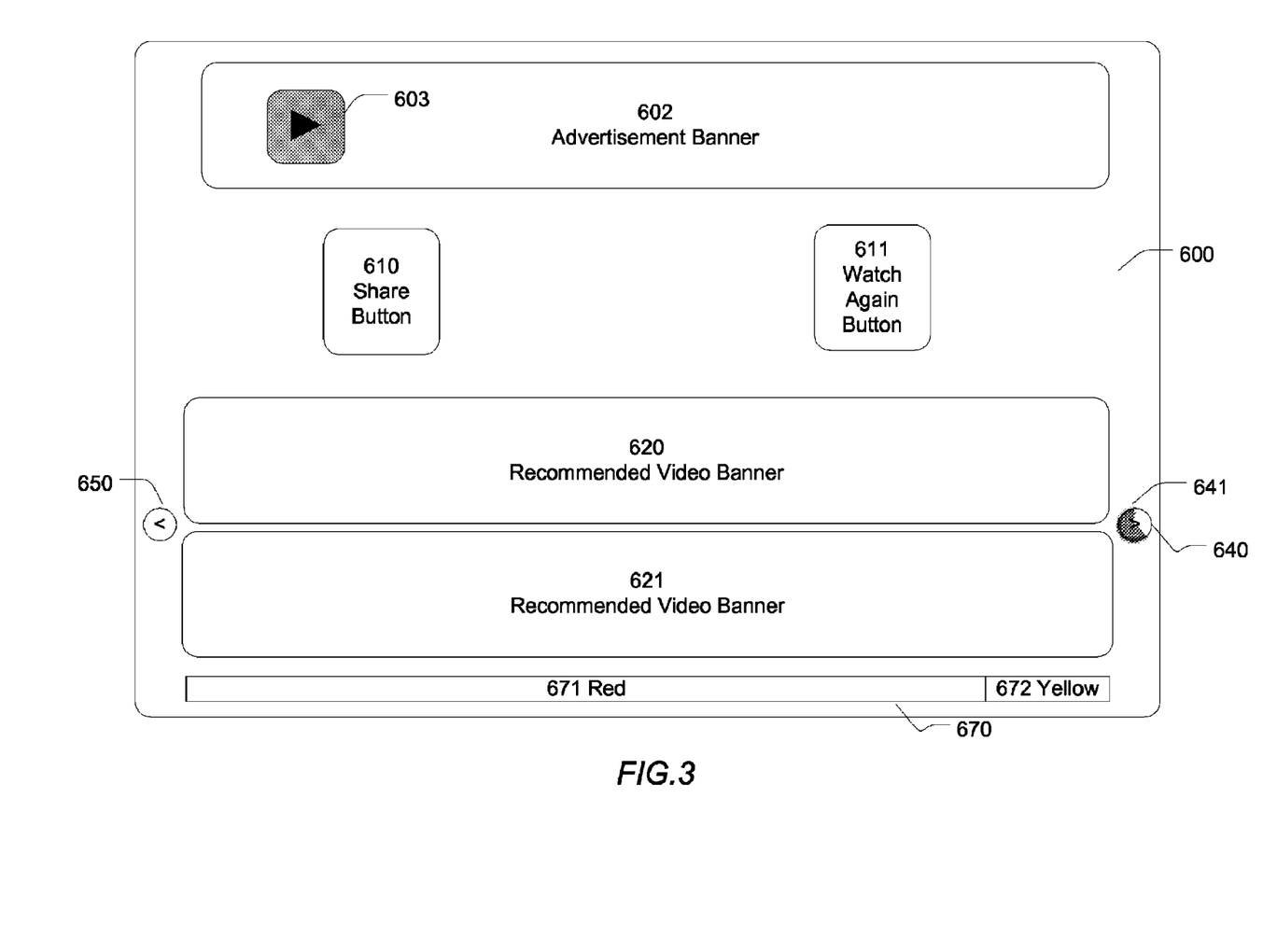
FIG. 3 illustrates a web page implementing an exemplary interface in a "post-roll" mode of operation.

Turning now to FIG. 3, an exemplary post-roll advertising interface 600 is shown. In this example, the background of interface 600 is simply the final frame (or a representative frame) of the video that the viewer just finished watching. In addition, the viewer is presented not only with banners 620, 621 recommending videos for the viewer to request, such as those that are highly rated or often requested by people who have seen the video that was just shown to the viewer, but also with an advertising banner 602. In many applications, a user will appreciate not getting confused between what is a shared video and what is an advertisement, so in one embodiment the advertisement banner 602 is distinctly positioned above the suggested video banners 620, 621, and separated from them by other user interface buttons, e.g., the "share" and "watch again" buttons 610, 611. Further distinction is achieved by making the advertisement banner 602 opaque and the recommended video banners 620, 621 translucent, and by placing an "Advertisement" legend on the advertisement banner 602.

A "play" button 603 indicates that the advertising content is video. In other applications, it may be considered desirable to minimize or even remove such distinctions, and in some embodiments the administrator can make those choices when associating advertising content with a video. It should be recognized that, particularly in the case of post-roll advertising, the advertising content may not be an advertisement per se, but is in some applications sponsored video content. In such applications, an appropriate legend, e.g., "sponsored content" is used if it is desired to distinguish such content from other shared video.

Usability of interface 600 is enhanced by its simple appearance, yet it is typically desirable to provide a viewer with a fairly large number of recommended videos. In practice, it is found that providing a relatively small number of proposed videos, e.g., via banners 620, 621, and then every few seconds changing the videos that are proposed on those buttons, provides a satisfying user experience. To facilitate user control of such cycling, in one embodiment interface 600 includes interface buttons 640 and 650 to allow a user to cycle through new sets of recommended video banners in forward and backward directions, respectively. If the user does not make such selection, it is accomplished automatically after a number of seconds. The amount of time between cycles is dynamically illustrated for the viewer by a moving pie slice interface 641 that progresses in a clockwise direction while a particular set of banners is being displayed. When the pie slice indicator moves from the 12 o'clock position all the way back around to the 12 o'clock position again, it indicates that 100% of the display time has passed and the banners cycle to the next set of recommended videos. In other embodiments, a similar pie timer can be used to display a percentage of a playing video that has been played (e.g., shading between 12 and 3 indicates that a quarter of the video has been watched. In other embodiments, a similar pie timer can be used to display a percentage of a download or other activity that has been completed.

In one embodiment, moving a mouse pointer over one of the recommended video banners 620, 621 pauses the countdown, while moving the mouse pointer off of the banners 620, 621 resumes the countdown. Also, in one embodiment moving the mouse pointer over one of the recommended video banners 620, 621 causes a thumbnail image on the banner to periodically change, rotating through other thumbnail images from the same recommended video. Moving the mouse pointer off of the banner stops the thumbnail image from changing. In one alternative embodiment, the thumbnail image remains constant, even when a mouse pointer is moved over the banner; in another alternative embodiment, the thumbnail image continues to cycle through the different thumbnails even if the mouse pointer is moved off of the banner.

Similarly, an administrator can select to have multiple advertisements associated with a selected video, and when one advertisement plays, a "next" button on that ad allows a user to immediately skip to the next ad. The next button similarly includes a pie slice timer indicating to the user that if no selection is made, the next ad will automatically cycle in after a period of time.

Another selection that can be made by an administrator is to have website links superimposed upon a video advertisement so that anytime during playback of the advertisement, the viewer can choose to go to a website associated with the advertisement. For added visibility, for example in light-background video advertisements, a horizontal translucent shading bar helps direct the viewer's eyes to the displayed URL for the website, as well as other user interface controls (e.g., the "next" button).

Rather than immediately starting playback of a video advertisement, which may be unduly distracting to viewers, in one embodiment only the first frame of a video advertisement initially is shown, along with a large "play" button icon in the center of the advertisement screen. This is found to strongly suggest to the user to play the video advertisement without the distraction that automatic initiation might impose, or the risk that the ad might run when the user is not actually viewing the window. For ads that are images rather than videos, display is the same, other than not having the large "play" button icon.

Also in one embodiment, a timer/slider bar 670 appears in interface 600 that provides indication of playback and loading progress, as well as fast user control of forward and backward placement within the requested video. In addition, this interface is displayed in two colors: one to represent requested video content and another to represent advertising content. In one embodiment, a red portion 671 represents requested content and a yellow portion 672 represents advertising content. With this interface, a user navigating through a video can readily tell how much advertising accompanies a requested video, as well as where it is.

In an alternate embodiment, interface 600 further distinguishes advertising content from recommended video content by including video banners e.g., 620, 621, but not including any advertisement banner 602. Rather than a banner, advertising is displayed in this embodiment with only textual content (with or without a link to an advertiser's website), for example at the bottom of interface 600.

In one embodiment, insertion of advertising content is facilitated by using a format that is compatible with existing/future web advertising standards, e.g., 25 character maximum header, two-line (approximately 70 character maximum) description, and 35 character maximum display URL.

Figure 4:
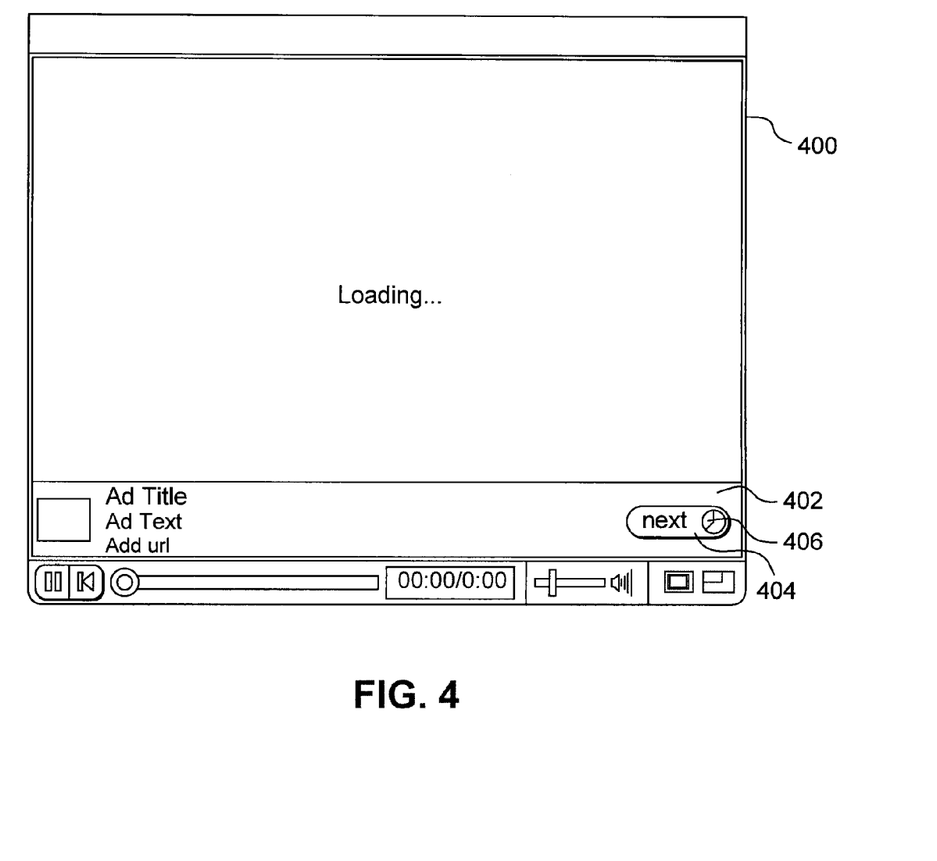
FIG. 4 illustrates an example interface for presenting a text advertisement.

FIG. 4 is an example interface for presenting selected advertising content. In this embodiment, the advertisement is a text advertisement. A banner 402 superimposed on the content window 400 displays the text advertising content including, for example, an ad title, ad text, and an ad URL providing a link to a web site. A next button 404, when selected by a user, cycles to new advertising content. The next button 404 includes a pie chart time indicator 406 similar to that described above. The pie chart time indicator 406 shows a percentage of time that the current text advertisement has been displayed before automatically cycling to the next advertisement. For example, when 100% of the display time has passed, the interface may automatically cycle to a new text advertisement, a video advertisement, or other content. In one embodiment, the text advertising content is displayed as new requested video content is loading in the video content window 400.

Figure 5:
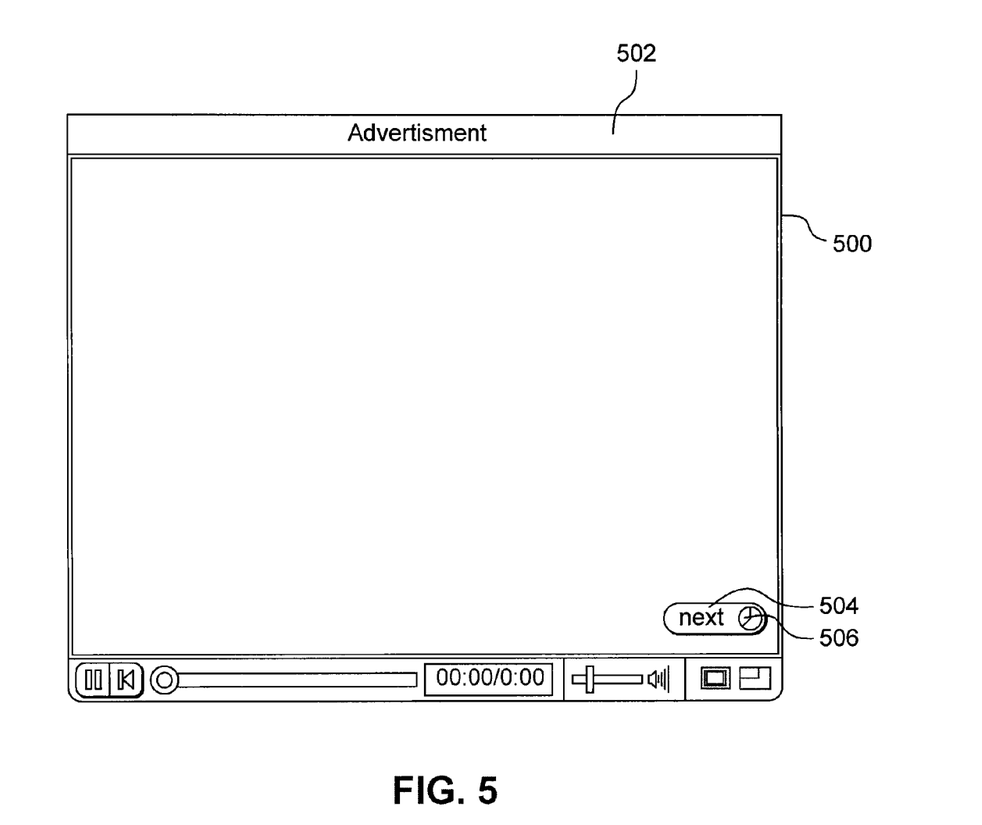
FIG. 5 illustrates an example interface for presenting a video advertisement.

FIG. 5 is another example interface for presenting selected advertising content. In this embodiment, the advertisement is a video advertisement which is displayed over the video content window 500. An "Advertisement" legend 502 indicates that the video is an advertisement so that the user can distinguish between advertising content and requested content. As with the text advertisement described above, the interface includes a next button 504 having a pie chart time indicator 506 showing the percentage of time the current video advertisement has been displayed before automatically cycling to the next advertisement. In an alternate embodiment, the pie chart indicator 506 indicates when the video advertisement will be finished but no automatic cycling occurs.

Reference in the specification to "one embodiment" or to "an embodiment" means that a particular feature, structure, or characteristic described in connection with the embodiments is included in at least one embodiment of the invention. The appearances of the phrase "in one embodiment" or "a preferred embodiment" in various places in the specification are not necessarily all referring to the same embodiment.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of a method. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

I claim:

1. A method of providing an interface for navigating videos on a display, comprising:
    presenting, by a client device, a first set of video thumbnails representing a first set of videos;
    presenting a navigation control icon that when selected causes the client device to display a second set of video thumbnails representing a second set of videos;
    presenting a timer displayed within the navigation control icon, the timer representing a duration of time remaining for display of the first set of video thumbnails absent selection of the navigation control icon; and
    presenting the second set of video thumbnails responsive to lack of user selection of the navigation control icon within the duration of time indicated by the timer.

2. The method of claim 1, wherein presenting the navigation control icon includes presenting the timer as a sweep-timer.

3. The method of claim 1, wherein presenting the navigation control icon includes presenting the timer as a sweep-timer having an inner portion of a first appearance and a peripheral portion of a second appearance.

4. The method of claim 1, wherein presenting the navigation control icon includes presenting the timer as a sweep-timer having a first portion indicative of time remaining and a second portion indicative of time elapsed.

5. The method of claim 4, wherein the first portion indicative of time remaining is translucent and partially obstructs the navigation control icon.

6. The method of claim 1, further comprising: responsive to a first user action, interrupting the timer.

7. The method of claim 6 wherein the first user action includes a mouseover of the first set of video thumbnails.

8. The method of claim 6 further comprising:
    responsive to a second user action, resuming the timer.

9. The method of claim 8 wherein the second user action includes moving a navigation pointer off of the first set of video thumbnails.

10. A user interface system comprising a non-transitory computer-readable storage medium storing instructions executable by a processor, the instructions when executed by the processor causing display of a user interface, the user interface comprising:

a first set of video thumbnails representing a first set of videos; a navigation control icon presented with the first set of video thumbnails, the navigation control icon when selected causes display of a second set of video thumbnails representing a second set of videos; and a timer displayed within the navigation control icon, the timer representing a duration of time remaining for display of the first set of video thumbnails absent selection of the navigation control icon;

wherein the second set of video thumbnails is presented responsive to lack of user selection of the navigation control icon within the duration of time indicated by the timer.

11. The user interface system of 10, wherein timer is visually displayed as a sweep-timer on the navigation control icon.

12. The user interface system of 10, wherein the timer is a sweep-timer having an inner portion of a first appearance and a peripheral portion of a second appearance.

13. The user interface system of 10, wherein the timer includes a first portion indicative of time remaining and a second portion indicative of time elapsed.

14. The user interface system of 13, wherein the first portion becomes smaller with time.

15. The user interface system of 10, wherein the timer is pie-shaped such that at an initial time the timer appears as a complete pie and as time advances, the timer appears as a pie with progressively smaller portions remaining.

16. The user interface system of 15, wherein the timer is translucent and partially obstructs the navigation control icon.

17. The user interface system of claim 10, wherein the timer is adapted to pause responsive to a first user action.

18. The user interface system of claim 17 wherein the first user action includes a mouseover of the first set of video thumbnails.

19. The user interface system of claim 17, wherein the timer is further adapted to resume responsive to a second user action.

20. The user interface system of claim 19 wherein the second user action includes moving a navigation pointer off of the first set of video thumbnails.

21. A user interface system comprising a non-transitory computer-readable storage medium storing instructions executable by a processor, the instructions when executed by the processor causing display of a user interface, the user interface comprising:

an advertising portion displaying first advertising content, the first advertising content having a duration of time for display;

a next button that when selected causes the advertising portion of the user interface to cycle to second advertising content;

a pie chart time indicator displayed within the next button, the pie chart time indicator representing a percentage of the duration of time remaining for display of the first advertising content absent selection of the next button, wherein responsive to the pie chart indicator indicating that 100% of the duration of time for display of the first advertising content has elapsed, automatically cycling to the second advertising content.

22. A computer program product for use in conjunction with a computer system, the computer program product comprising a non-transitory computer readable storage medium and a computer program mechanism embedded therein, the computer program mechanism comprising:

instructions for providing a first set of banners corresponding to a first set of recommended videos;

instructions for providing a navigation control icon that when selected causes the computer system to display a second set of banners representing a second set of recommended videos;

instructions for providing a timer displayed within the navigation control icon, the timer representing a duration of time remaining for display of the first set of video thumbnails absent selection of the navigation control icon;

instructions for detecting a pointer being positioned over one of the first set of banners, and responsive to the detection, pausing the timer and cycling through thumbnail images from the recommended video associated with the banner;

instructions for detecting the pointer being positioned off of the first set of banners, and responsive to the detection, stopping the cycling through the thumbnail images and resuming progression of the timer; and instructions for providing the second set of video thumbnails in response to the timer indicating progression of a threshold period of time without user selection of the navigation control icon.

23. A method performed by a computer system, comprising:

displaying, by a client device, first media content in a media playback window;

displaying a next button that when selected causes the client device to display second media content in the media playback window;

displaying a pie chart interface element within the next button; and after playback of the first media content begins, dynamically changing a shading of the pie chart interface element with time to represent a current percentage of the media content that has been completed and a percentage of the media content remaining, wherein when the media content is completed, the entirety of the pie chart interface element is displayed as shaded.

24. The method of claim 23, wherein the first media content comprises video content.

25. The method of claim 23, wherein the first media content comprises audio content.

26. The method of claim 23, wherein the first media content comprises a text display.

27. The method of claim 23, wherein the first media content comprises display of a first display element for a predetermined period of time.

28. The method of claim 27, wherein after the predetermined period of time, a second display element is displayed and the pie chart interface element is reset to indicate a percentage of time that has passed in a predetermined display time for the second display element.

29. The method of claim 23, wherein a user cannot discern the total expected length of the media content by observing the media content without also observing the pie chart interface element.

* * * * *